(12) United States Patent
Tao et al.

(10) Patent No.: US 6,827,822 B2
(45) Date of Patent: Dec. 7, 2004

(54) METHOD AND APPARATUS FOR INCREASING AND MODULATING THE YIELD SHEAR STRESS OF ELECTRORHEOLOGICAL FLUIDS

(75) Inventors: Rongjia Tao, Melrose Park, PA (US); Yucheng Lan, Elkins Park, PA (US); Xiaojun Xu, Elkins Park, PA (US); Edward Kaczanowicz, Flourtown, PA (US)

(73) Assignee: Temple University of the Commonwealth System of Higher Education, Philadelphia, PA (US)

( * ) Notice: Subject to any disclaimer, the term of this patent is extended or adjusted under 35 U.S.C. 154(b) by 439 days.

(21) Appl. No.: 10/007,575

(22) Filed: Nov. 9, 2001

(65) Prior Publication Data

US 2003/0089596 A1 May 15, 2003

(51) Int. Cl.⁷ ................................................ B01J 19/08
(52) U.S. Cl. ........................ 204/164; 204/450; 205/687
(58) Field of Search ................................ 204/164, 450; 205/687

(56) References Cited

U.S. PATENT DOCUMENTS

| | | |
|---|---|---|
| 5,507,967 A | 4/1996 | Fujita et al. |
| 5,558,803 A | 9/1996 | Okada et al. |
| RE35,773 E | 4/1998 | Okada et al. |
| 5,843,331 A | 12/1998 | Schober et al. |
| 5,891,356 A | 4/1999 | Inoue et al. |
| 6,027,429 A | 2/2000 | Daniels |
| 6,096,235 A | 8/2000 | Asako et al. |
| 6,116,257 A | 9/2000 | Yokota et al. |
| 6,149,166 A | 11/2000 | Struss et al. |
| 6,159,396 A | 12/2000 | Fujita et al. |
| RE37,015 E | 1/2001 | Rensel et al. |
| 6,231,427 B1 | 5/2001 | Talieh et al. |
| 6,251,785 B1 | 6/2001 | Wright |
| 6,297,159 B1 | 10/2001 | Paton |

OTHER PUBLICATIONS

R. Tao et al., "Three–Dimensional Structure of Induced Electrorheological Solid", Phys. Rev. Lett., vol. 67, No. 3, Jul 15, 1991, pps. 398–401.

Chen et al., "Laser Diffraction Determination of the Crystalline Structure of an Electrorheological Fluid", Phys. Rev. Lett., vol. 68, No. 16, Apr. 20, 1992, pps. 2555–2558.

G.L. Gulley et al., "Static Shear Stress of Electrorheological Fluids", Phys. Rev. E, vol. 48, No. 4 Oct. 1993, pps. 2744–2751.

X. Tang et al., "Structure–enhanced Yield Stress of Magnetorheological Fluids", J. of Applied Physics, vol. 87, No. 5, Mar. 1, 2000, pps. 2634–2638.

R. Tao et al., "Electrorheological Fluids Under Shear", International J. of Modern Physics B, vol. 15, 2001.

*Primary Examiner*—Kishor Mayekar
(74) *Attorney, Agent, or Firm*—RatnerPrestia (57) ABSTRACT

A method for increasing and/or modulating the yield shear stress of an electrorheological fluid includes applying a sufficient electric field to the fluid to cause the formation of chains of particles, and then applying a sufficient pressure to the fluid to cause thickening or aggregation of the chains. An apparatus for increasing and/or modulating the transfer or force or torque between two working structures includes an electrorheological fluid and electrodes through which an electric field is applied to the fluid such that particles chains of particles are formed in the fluid and, upon application of pressure to the fluid, the chains thicken or aggregate and improve the force or torque transmission.

10 Claims, 10 Drawing Sheets

METHOD AND APPARATUS FOR INCREASING AND MODULATING THE YIELD SHEAR STRESS OF ELECTRORHEOLOGICAL FLUIDS

FIELD OF THE INVENTION

The present invention relates to electrorheological fluids. More specifically, it relates to a method for increasing and/or modulating the yield shear stress of electrorheological fluids and to an apparatus employing such method.

BACKGROUND OF THE INVENTION

Electrorheological (ER) fluids and ER effects are well known in the art. Since the discovery of ER fluids around 1947, many efforts have been made to increase the yield shear stress of ER fluids to a level at which they can advantageously be used for various industrial applications, such as actuators for torque transmission (such as clutch, brake, and power transmission), vibration absorption (such as shock absorber, engine mount, and damper), fluid control (such as servo valve and pressure valve) and many other industrial applications. ER fluids are generally more energy efficient than hydraulic, mechanical or electromechanical devices which serve the same function. However, the strength of ER fluids has not been generally high enough in the past. The search for strong ER fluids has produced limited results. ER fluids currently have yield shear stress up to about 5 kPa in the presence of an applied electric field, not generally sufficient for major industrial applications, most of which therefore do not utilize ER fluids. The present invention achieves increased yield shear stress through a novel use of the microstructure properties of ER fluids.

The flow characteristics of an ER fluid change when an electric field is applied through it. The ER fluid responds to the applied electric field by what can be described as progressively gelling. More specifically, the ER fluid is generally comprised of a carrier fluid, such as pump oil, silicone oil, mineral oil, or chlorinated paraffin. Fine particles, such as polymers, minerals, or ceramics, are suspended in the carrier fluid. When an electric field is applied through the ER fluid, positive and negative charges on the particles separate, thus giving each particle a positive end and a negative end. The suspended particles are then attracted to each other and form chains leading from one electrode to the other. These chains of particles cause the ER fluid to "gel" in the electric field between the electrodes in proportion to the magnitude of the applied electric field. Thus, the prior art provides a means to increase the yield shear stress ("effective viscosity") of an ER fluid by application of an electrical field, but the maximum yield shear stress thus attained (up to about 5 kPa) is still not sufficient for use in most industrial applications.

For the reasons described above, a method for increasing and/or modulating the yield shear stress of ER fluids by a simple process would be desirable. In addition an apparatus employing such method of increasing and/or modulating the yield shear stress of ER fluids would further be desirable.

SUMMARY OF THE INVENTION

The present invention is directed to a method for increasing and/or modulating the yield shear stress of ER fluids and to an apparatus employing such method.

According to the method of the present invention, a sufficient electric field is first applied to the ER fluid to cause particles within the ER fluid to form into chains of particles and to cause the ER fluid to "gel" in the electric field applied between the electrodes. Then, a sufficient pressure is applied to the ER fluid between the electrodes, while the electric field applied in the previous step is substantially maintained. This causes the chains of particles to thicken and thus increases the yield shear stress. The pressure and the shear stress may be applied in any direction, relative to that of the applied electric field, which causes the chains of particles to thicken. When the increased shear stress is no longer needed or needs to be modulated upwardly or downwardly, the pressure and, optionally, the electric field are adjusted upwardly or downwardly as required.

In a first embodiment of the method of the invention, the pressure is applied in a direction substantially perpendicular to that of the electric field, in which case the chains aggregate and thus become thicker. In a second embodiment, the pressure is applied in a direction substantially parallel to that of the electric field, in which case the chains become shorter and thus become thicker. However, as contemplated in the present invention, the pressure may be applied in any direction with respect to that of the applied electric field which results in thickening of the chains through a combination of shortening and aggregation of the chains.

According to the apparatus of the present invention, the ER fluid is placed between and in communication with two working structures, between which a force or a torque is to be transmitted (through the ER fluid). The ER fluid is also in communication with at least two electrodes having different electric potentials, which serve to apply an electric field through the ER fluid when an increase in the yield shear stress is desired. The electrodes may be on the same or different working structures, or be separate from them. A sufficient electric potential is first applied to the electrodes to cause particles within the ER fluid between the electrodes to form into chains of particles and to cause the ER fluid to gel. Then, a sufficient pressure is applied to the ER fluid, suitably by bringing the two working structures closer together, while the electric potential applied in the previous step is substantially maintained, to cause the chains of particles to become thicker and thus to increase the yield shear stress. The increase in the yield shear stress resulting from the applied pressure causes any force or torque which is provided by one working structure to be transmitted more efficiently to the other working structure. When the more effective force or torque transmission is no longer needed, the pressure and, optionally, the electric field may be removed. If an intermediately effective force or torque transmission is needed, the applied pressure may be decreased while the applied electric field remains applied at the same, a higher, or a lower level. Thus, once a higher yield shear stress has been established, it may be modulated upwardly or downwardly as required by increasing or decreasing the strength of the electric field, the applied pressure, or both.

In a first embodiment of the apparatus of the invention, the first working structure is preferably electrically insulating, but may also be grounded electrically, and the electrodes are all on the second working structure, the working surface of which is parallel to the working surface of the first working structure. In this embodiment, the chains of particles form in the vicinity of the second working structure, between electrodes through the ER fluid. Pressure is applied in a direction perpendicular to that of the electric field by bringing the two working surfaces closer together, which causes aggregation of the chains into thicker chains, providing an increase in the yield shear stress. In one variation of this embodiment, the electrodes have an alternating arrangement on the second working structure, separated by insulating zones, so that neighboring (adjacent) electrodes have different electric potentials. However, other electrode arrangements are possible with similar results. In addition, other variations of this embodiment are possible in which the two working structures are not parallel and/or not planar.

In a second embodiment of the apparatus of the invention, the two working structures are parallel and each one serves as an electrode. In this embodiment, the chains of particles form between the two working structures, through the ER fluid. Pressure is applied in a direction parallel to that of the electric field by bringing the two working surfaces closer together, which causes the chains to become shorter and thus thicker, again providing an increase in the yield shear stress. Variations of this embodiment are also possible in which the two working structures are not parallel and/or not planar.

It is to be understood that both the foregoing general description and the following detailed description are exemplary, but not restrictive, of the invention.

BRIEF DESCRIPTION OF THE DRAWINGS

Like reference numbers denote like elements throughout the drawings.

DETAILED DESCRIPTION OF THE INVENTION

The present invention increases the yield shear stress of electrorheological (ER) fluids, by producing a change in their microstructure through the application of pressure. Referring to FIGS. 1–10, the present invention is directed to a method for increasing and/or modulating the yield shear stress of ER fluids and to an apparatus employing such method.

The method for increasing the yield shear stress of an ER fluid 10 according to the present invention comprises the steps of:

a) applying a sufficient electric field to the ER fluid 10 to cause particles within the ER fluid 10 to form into chains of particles within the electric field; and b) applying a sufficient pressure to the ER fluid 10, after step a) and while substantially maintaining the electric field applied in step a), to cause the chains of particles to thicken or aggregate and thus impart to the ER fluid 10 an increase in the yield shear stress.

Further, following increasing the yield shear stress of the ER fluid 10 according to steps a) and b) above, the yield shear stress can be modulated by one of the following additional steps:

c) decreasing or increasing the applied pressure, after step b), to modulate the yield shear stress downwardly or upwardly as required to adjust the force or torque being transmitted from one working structure to another working structure;

d) decreasing or increasing the applied electric field, after step b) to modulate the yield shear stress downwardly or upwardly as required to adjust the force or torque being transmitted from one working structure to another working structure; or e) combining steps c) and d) to modulate the yield shear stress downwardly or upwardly as required.

An example of the method above described for increasing and/or modulating the yield shear stress of an ER fluid 10 according to the present invention comprises the steps of:

a) applying a sufficient electric field to the ER fluid 10 to cause particles within the ER fluid 10 to form into chains of particles within the electric field;

b) applying a sufficient pressure to the ER fluid 10, after step a) and while substantially maintaining the electric field applied in step a), to cause the chains of particles to thicken or aggregate and thus impart to the ER fluid 10 an increase in the yield shear stress;

c) decreasing or removing the applied pressure, after step b) and while substantially maintaining the electric field applied in step a), to cause the thickness of the chains of particles to decrease and thus impart to the ER fluid 10 a decrease in the yield shear stress; and d) repeating steps b) and c) as needed.

In this example of the method of the invention, because the electric field remains, the yield shear stress that remains after step c) is not zero, as it would be if the electric field were also removed. It may be noted that the maximum yield shear stress which can be obtained with most ER fluids in the absence of applied pressure is so low (typically 5 kPa or less) that removal of the electric field will not be necessary in some applications, for which this example of the method of the invention will thus be adequate.

In each of the embodiments and examples described herein, it is preferred that the ER fluid 10 has a volume fraction not too low or too high and comprises dielectric particles in a non-conducting liquid, such as oil, like (but not limited to) pump oil, transformer oil, silicon oil, etc. The term "volume fraction", as used in the present application, refers to the volume of net dielectric particles relative to the volume of the ER fluid, and its useful range of values is well known in the prior art pertaining to ER fluids. The tests of the present invention with a volume fraction of 35% give an excellent result, but tests with other volume fractions work well too, for example, a volume fraction of about 10% to about 60%, more specifically about 20% to about 50%.

For the methods of the present invention being described, each of the steps may be carried out at varying parameters and conditions. The parameters and conditions which are disclosed allow one of skill in the art to carry out the particular described method(s), but are not intended to imply that the particular described method(s) cannot be effectively or efficiently carried out at other parameters and/or conditions. The specific parameters and conditions chosen may vary due to many factors, such as the particular ER fluid being used, the desired increase in or level of yield shear stress of the ER fluid, the specific apparatus or device required to carry out these methods, etc.

The step of applying an electric field, or step a), of the embodiments described in the present application causes the particles within the ER fluid 10 to form into chains of particles when a sufficient electric field is applied to the ER fluid 10, via electrodes, by direct application to the ER fluid 10, or by any other known suitable method. For example, the electrodes may be separated from the ER fluid 10 by an electrically insulating layer and still apply a sufficient electric field (albeit more or less attenuated) to the ER fluid 10. There is no hard limit as to the strength of the electric field being applied in this step, but the useful range of values is well known in the prior art pertaining to ER fluids. The electric field should be sufficiently high such that an adequate number of chains of particles are formed in the ER fluid 10. The electric field applied may, for example, be in the range of about 500 V/mm to about 3000 V/mm, more specifically about 1000 V/mm to about 2000 V/mm. The electric field may be DC or AC.

The step of applying pressure, or step b), of the embodiments described in the present application causes the chains of particles that are formed in step a) to thicken when a sufficient pressure is applied to the ER fluid 10 while the electric field is being maintained. The thickening of the chains provides the ER fluid 10 with an increase in yield shear stress. The step of applying pressure is required to occur after step a) and while the electric field applied in step a) is substantially maintained. The pressure applied may be in the range about 50 kPa to about 850 kPa, but can be lower or higher, depending on the magnitude of the increase in yield shear stress which is required. The pressure may be applied in any direction relative to that of the applied electric field, including in particular, in a parallel direction (in which case the chains shorten and thus become thicker) or in a perpendicular direction (in which case chains aggregate and thus become thicker).

An apparatus employing the method for increasing and/or modulating the yield shear stress of an ER fluid 10 according to the present invention comprises two working structures, between which a force or a torque needs to be transmitted and an ER fluid 10 between them and in communication with them. The ER fluid 10 between the two working structures is also in communication with at least two electrodes having different electric potentials, which serve to apply an electric field through the ER fluid 10 when an increase in the yield shear stress is desired for the purpose of better transferring a force or torque between the two working structures. The electrodes may be part of one or both working structures, or may be separate from both of them, provided that they are within, or near the boundary of, the region between the two working structures. According to the method of the present invention, a sufficient electric field is first applied to the ER fluid 10, between the working structures, to form chains of particles and to cause the ER fluid 10 to "gel". The electric field is generated by applying an electric potential difference between the electrodes. Then, a sufficient pressure is applied to the ER fluid 10, suitably by bringing the two working structures closer together, while the electric potential difference applied in the previous step is substantially maintained, to cause the chains of particles to become thicker and thus to increase the yield shear stress. The increase in the yield shear stress resulting from the applied pressure improves the transmission of any force or torque between the working structures. When the improved force or torque transmission is no longer needed, the pressure and, optionally, the electric field are removed or modulated upwardly or downwardly as required for a particular application.

Figure 1:
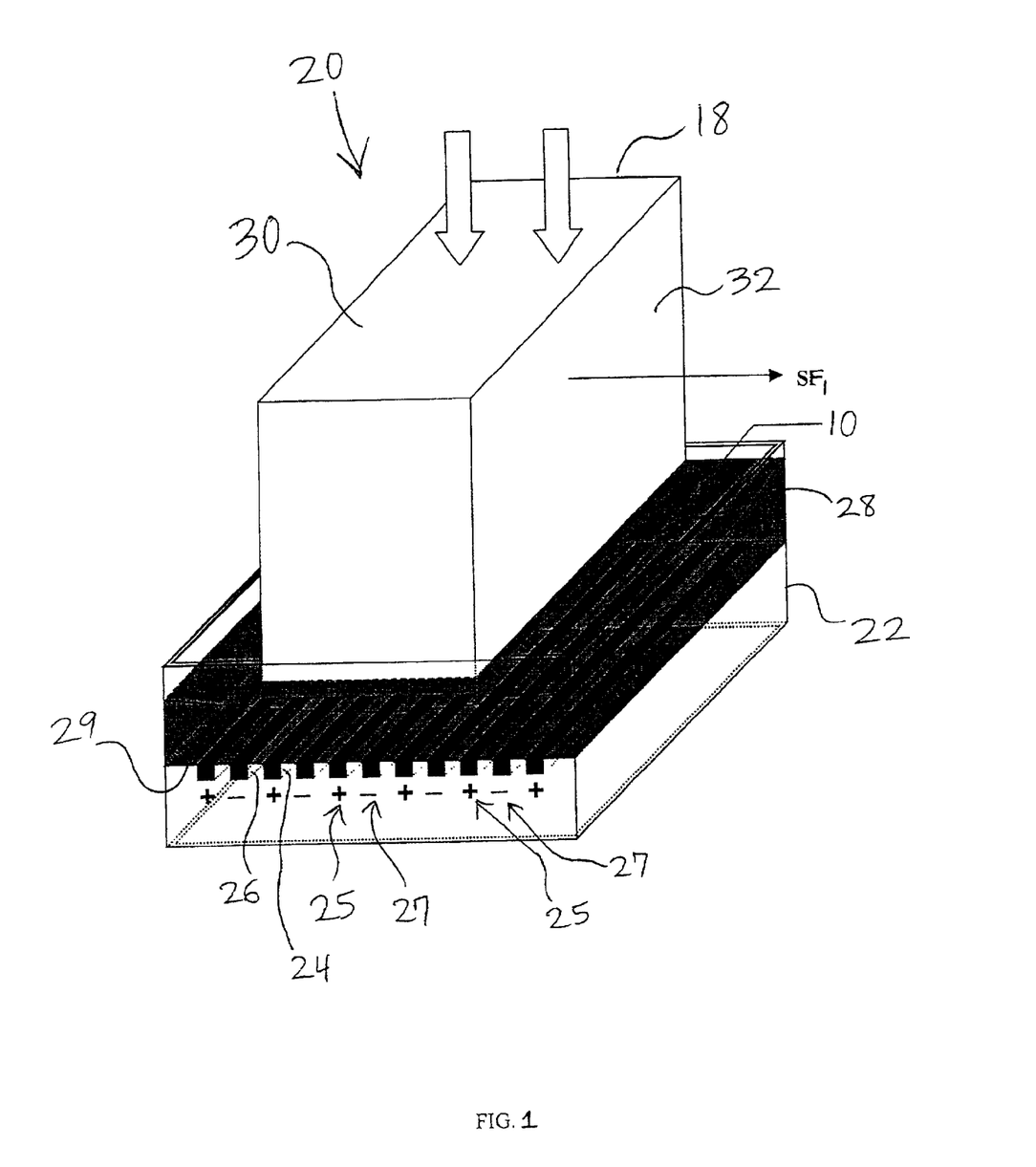
FIG. 1 illustrates the first embodiment of an apparatus according to the present invention, with multiple electrodes on one of the working structures, the applied pressure being perpendicular to the electric field and the shear stress being applied parallel to the electric field.
Figure 2:
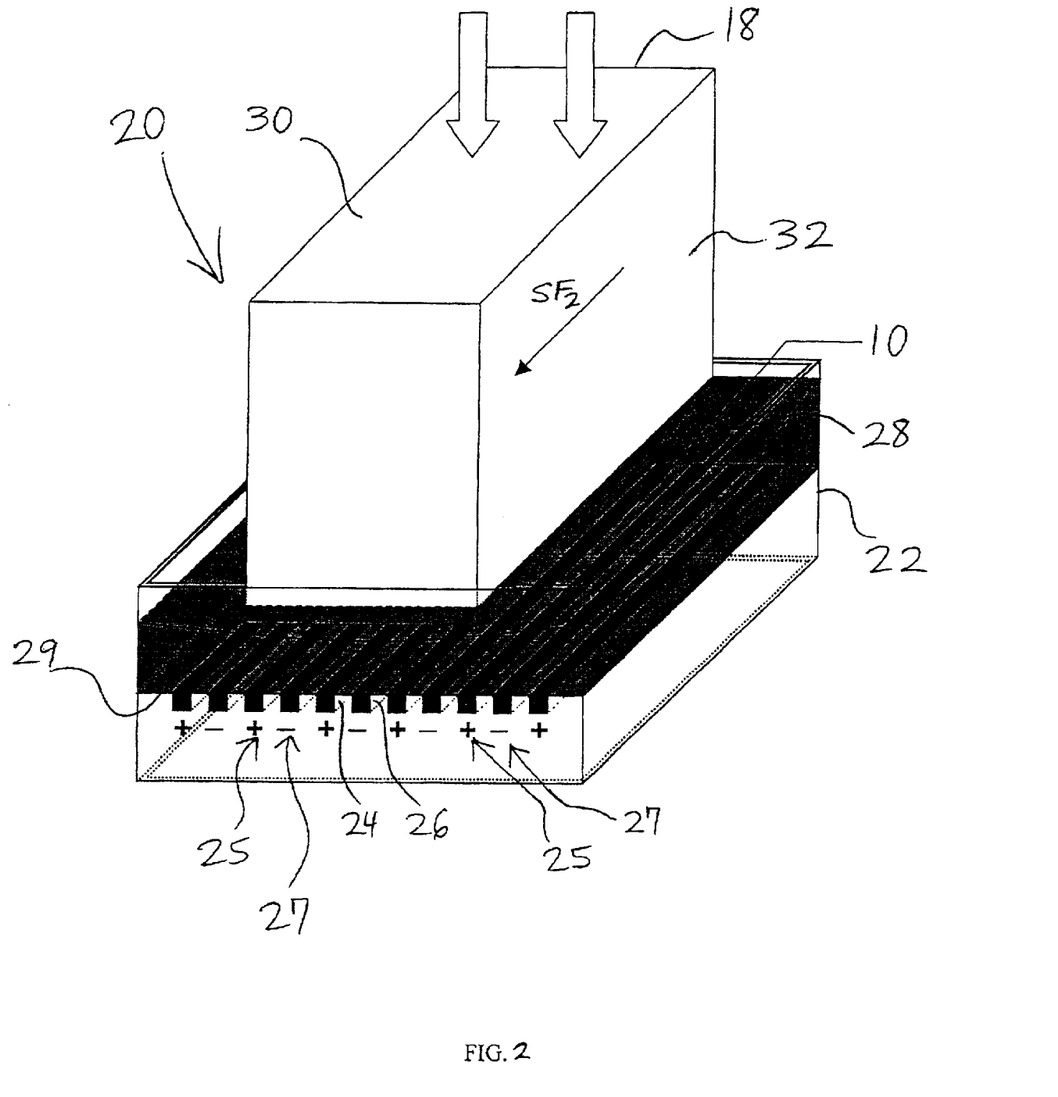
FIG. 2 illustrates the first embodiment of an apparatus according to the present invention, with multiple electrodes on one of the working structures, the applied pressure being perpendicular to the electric field and the shear stress being applied perpendicular to the electric field.
Figure 3:
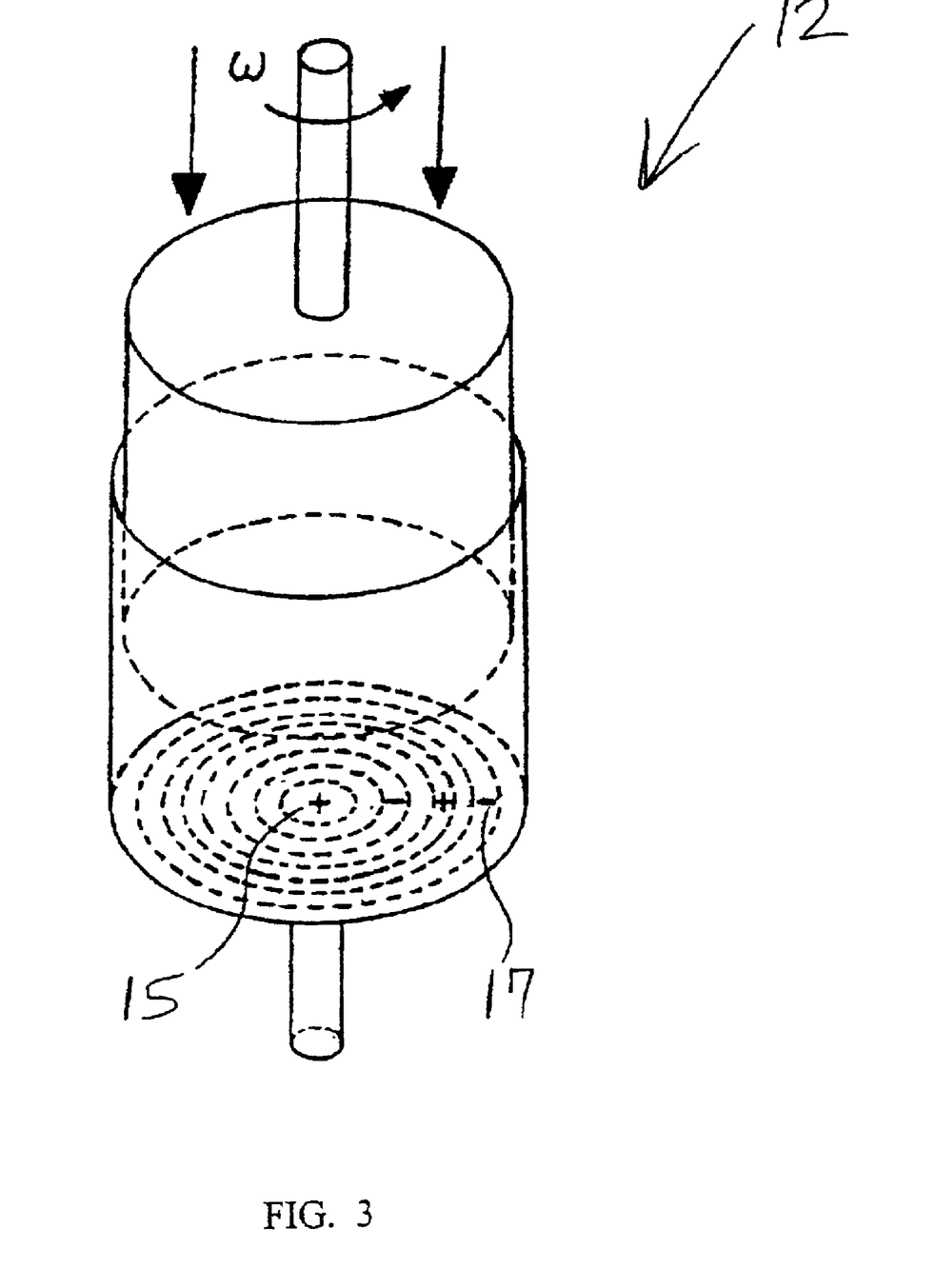
FIG. 3 illustrates a variation of the apparatus of FIG. 2.

In a first embodiment of the apparatus of the invention, the first working structure is preferably electrically insulating, but may also be grounded electrically, and all electrodes are on the second working structure as shown in greater detail in FIGS. 1–3. In this embodiment, the chains of particles form in the vicinity of the second working structure, going between electrodes through the ER fluid 10. Application of pressure is made by bringing the working structures closer together, and causes aggregation of the chains into thicker chains, thus leading to a higher yield shear stress and improved force or torque transmission. In this embodiment, the applied pressure and the electric field are perpendicular. In one variation of this embodiment, shown in FIGS. 1 and 2, linear parallel electrodes 25, 27 have an alternating arrangement on the second working structure 22, separated by insulating zones, so that neighboring electrodes 25, 27 have different electric potentials. In a variation of this embodiment, shown in FIG. 3, the apparatus 12 have electrodes 15, 17 that are circular and concentric. Many other variations are possible which maintain the essential features required to apply the method of the invention including, for example: (1) working surfaces that are not parallel to each other or are not planar (for example, concentric spherical sections), (2) electrodes which are part of a grid (open or not) which is not attached to either of the working structures but is between them, or (3) electrodes which are separated from the ER fluid 10 by an electrically insulating layer or membrane.

Referring to FIGS. 1 and 2, apparatus 20 according to the first embodiment of the apparatus of the present invention comprises a first working structure 18, a second working structure 22, metallic strips which serve as electrodes 25, 27, insulating barriers 24, 26, and an ER fluid 10. The first working structure 18 has an inner (bottom, in the figures) insulating surface 28 (which is in contact with the ER fluid 10), an outer surface 30, and a plurality of sides 32. The electrodes 25, 27 of this embodiment are embedded in the inner (top, in the figures) surface 29 (which is in contact with the ER fluid 10) of the second working structure 22 and are separated by insulating barriers 24, 26. The electrodes 25, 27 are positioned in an alternating arrangement such that each positive electrode 25 is positioned next to at least one negative electrode 27. The terms "positive" and "negative" in respect to the electrodes are not meant to convey any relationship to electric ground but, rather, to indicate that one electrode (positive) is at higher electric potential than the other (negative). Furthermore, the polarities (positive and negative) of the electrodes may be reversed without affecting the operation of the apparatus. This arrangement generates a sufficient electric field to align the particles of the ER fluid 10 into chains of particles which align in the ER fluid in the direction of the applied electric field. As illustrated in FIGS. 1 and 2, the top surface of the electrodes 25, 27 and the top surface of the barriers 24, 26, defining a working surface, are leveled, flat, smooth, and parallel to the inner surface 28 of the first working structure 18. This minimizes the viscous friction between this working surface and the ER fluid 10 when the electric field is not applied. The ER fluid 10 is positioned between the working structures 18, 22. When the apparatus 20 is in use, the working structures 18, 22 can be moved toward and away from each other. The first apparatus 20 and its variations, such as that illustrated in FIG. 3, are believed suitable for many industrial applications such as automobile clutch, torque transmission, etc. FIGS. 1–3 assign to the first working structure 18 all movement producing the applied pressure. In practice, movement of either or both working structures 18, 22 may contribute to the applied pressure.

In a variation (not illustrated) of the embodiments shown in FIGS. 1 and 2, all the electrode strips 25, 27 at the same electric potential may be combined into a single comb-shaped electrode having teeth so that the teeth of the positive comb-shaped electrode are intercalated between the teeth of the negative comb-shaped electrode. Each one of these two comb-shaped electrodes may be constructed by tying together all of the individual electrode strips 25, 27, shown in FIGS. 1 and 2, at the same electric potential through an electrically conducting cross-bar (either under the plane of the individual electrode strips or in the same plane as the individual electrode strips), or it may be manufactured as a single piece of the same comb-shaped electrode. A similar variation may be applied to the embodiment shown in FIG. 3.

In a further variation (not illustrated) of the first embodiment of the apparatus of the present invention, the electrodes are arranged in a two-dimensional array of alternating electrodes at different electric potentials, i.e., the two-dimensional equivalent of the one-dimensional arrays shown in FIGS. 1 and 2. Alternatively, the entire working surface, may serve as the single electrode at one electric potential, incorporating a two-dimensional array of holes permitting insertion of the electrodes at the other electric potential (and any insulating spacers). In either case, individual electrodes may be tied together, under the plane of the individual electrodes, into the two-dimensional equivalents of the comb-shaped electrodes described in the preceeding paragraph.

In a second embodiment of the apparatus of the invention, each working structure serves as an electrode to which a different electric potential is applied. In this embodiment, the chains of particles form between the two working structures, through the ER fluid. Application of pressure causes shortening of the chains, which become thicker, leading to a higher yield shear stress. In this embodiment, the applied pressure and the electric field are parallel. This embodiment has two principal disadvantages over the first embodiment, which may or may not be important in particular applications: (1) both working structures (which are rotating or moving in some other way relative to each other), rather than only one, require electrical connections; and (2) the distance between the electrodes changes when the working structures are brought closer together to apply the pressure, making control of the electric field (which, at constant applied electric potential, is inversely proportional to the distance between the electrodes) more difficult and introducing the possibility of electrical breakdown between the working structures. Variations of this embodiment are possible which maintain the essential features required to apply the method of the invention including, for example: (1) working surfaces that are not parallel to each other or are not planar (for example, concentric spherical sections), (2) multiple electrodes at the same electric potential on each working structure, (3) one or more electrodes which are not attached to either of the working structures but are between them, or (4) electrodes which are separated from the ER fluid 10 by an electrically insulating layer or membrane.

Figure 4:
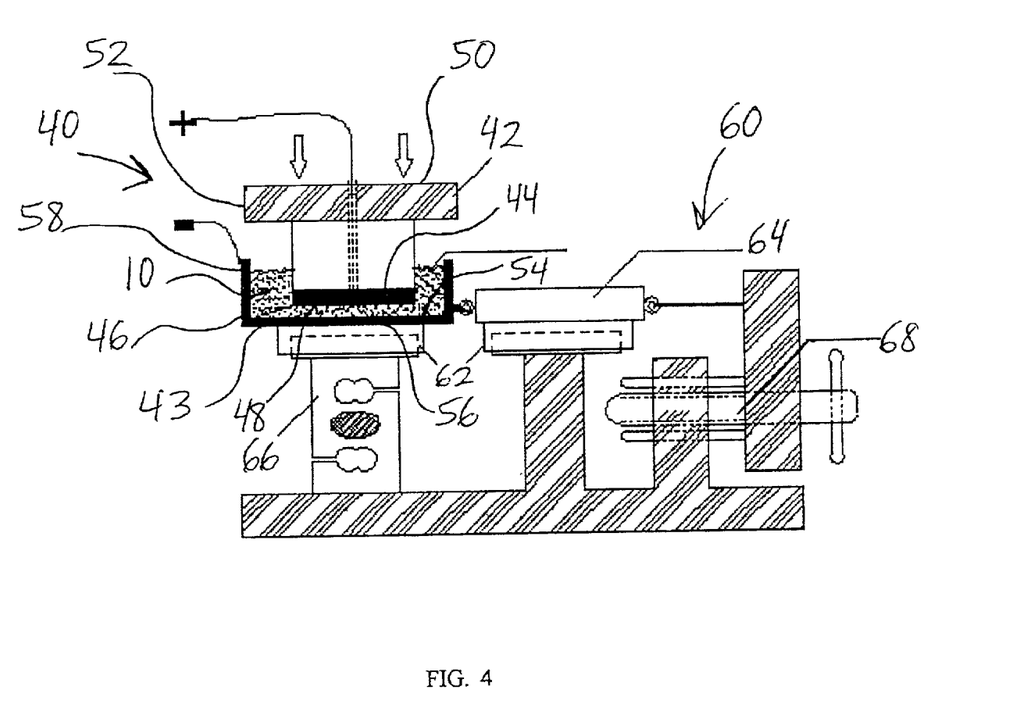
FIG. 4 illustrates the second embodiment of an apparatus according to the present invention, with one electrode in each working structure, the applied pressure being parallel to the electric field and the shear stress being applied perpendicular to the electric field, the apparatus being connected to a system used in measuring the yield shear stress of the electrorheological fluid, under compression.

Referring to FIG. 4, the apparatus 40 according to the second embodiment of the apparatus of the present invention comprises two working structures 42, 43, two electrodes 44, 46, and an ER fluid 10 positioned between the working structures 42, 43. The first working structure 42 has an inner surface 48 (which is in contact with the ER fluid 10), an outer surface 50, and a plurality of sides 52. The second working structure 43 has an inner surface 54 (which is in contact with the ER fluid 10), an outer surface 56, and a plurality of sides 58. The negative electrode 46 is positioned on the inner surface 54 of the second working structure 43. The positive electrode 44 is positioned on the inner surface 48 of the first working structure 42, and can be moved toward and away from the negative electrode 46 when apparatus 40 is in use. Again, the terms "positive" and "negative" in respect to the electrodes are not meant to convey any relationship to electric ground but, rather, to indicate that one electrode (positive) is at higher electric potential than the other (negative). Furthermore, the polarities (positive and negative) of the electrodes may be reversed without affecting the operation of the apparatus. FIG. 4 assigns to the first working structure 42 all movement producing the applied pressure. In practice, movement of either or both working structures 42, 43 may contribute to the applied pressure.

A third embodiment (not illustrated) of the apparatus of the invention combines the first and second embodiments. In this embodiment, both working structures incorporate multiple electrodes at different electric potentials, as described in the first embodiment for only one working structure, so that the applied electric field has components which are parallel and components which are perpendicular to the direction of the applied pressure. Application of the electric field leads to the formation, within the ER fluid 10, of chains of particles which go from electrode to electrode on the same working structure, as well as chains of particles which go from electrodes on one working structure to electrodes on the other working structure. In one variation of this embodiment, the electrode arrangement is the same on both working structures, except that their polarities are reversed, so that each positive electrode on one working structure is closest to: (1) at least one negative electrode on the same working structure and (2) at least one negative electrode on the other working structure. As illustrated in FIG. 4, the apparatus 40 is connected to the system 60 used in measuring the yield shear stress of the ER fluid 10. The system 60 used in measuring the yield shear stress includes a linear table 62, a first force sensor 64, a second force sensor 66, and a lead screw 68. The second force sensor 66 measures the normal pressure. Then, shear force is applied to the first force sensor 64 to determine the yield shear stress. A system similar to system 60 is used in measuring the yield shear stress of the ER fluid 10 in apparatus 20. Also, it is obvious to one of skill in the art that other systems can be used to measure the yield shear stress of the ER fluid 10.

Figure 5:
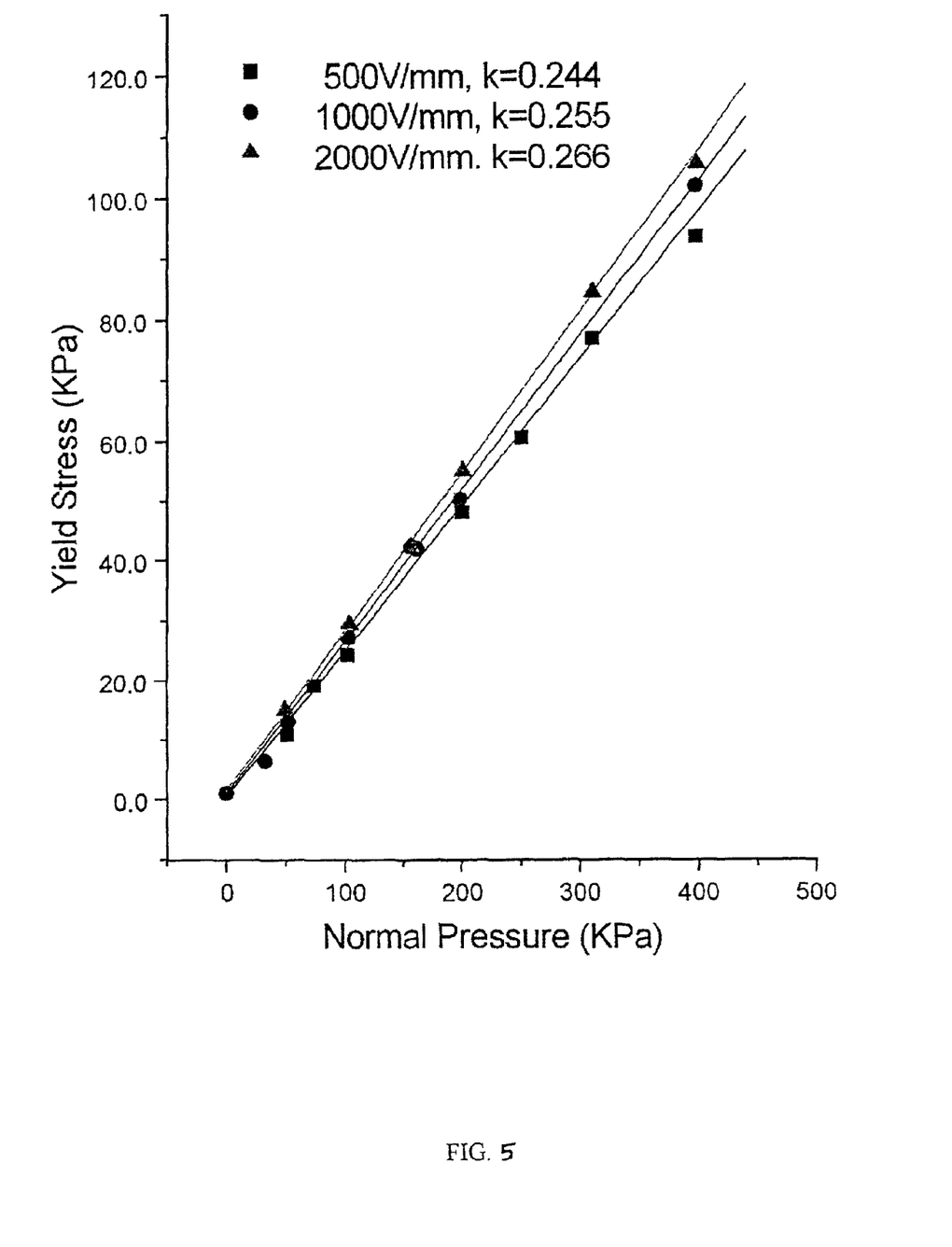
FIG. 5 is a graph showing the results of a yield shear stress measurement in which pressures, under different constant electric fields, having different values and having been applied to the electrorheological fluid according to the apparatus of FIG. 1.
Figure 6:
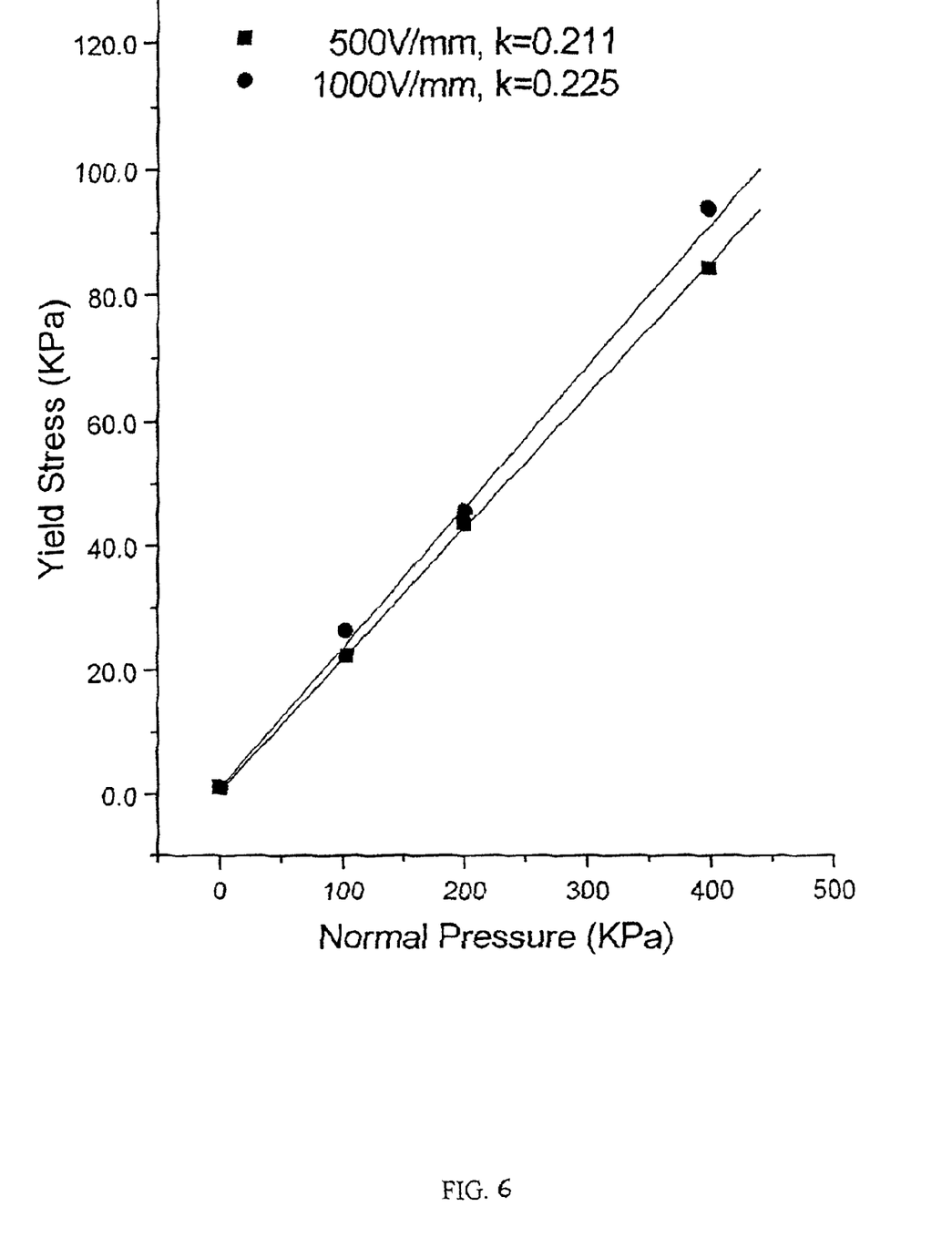
FIG. 6 is a graph showing the results of a yield shear stress measurement in which pressures, under different constant electric fields, having different values and having been applied to the electrorheological fluid according to the apparatus of FIG. 2.
Figure 7:
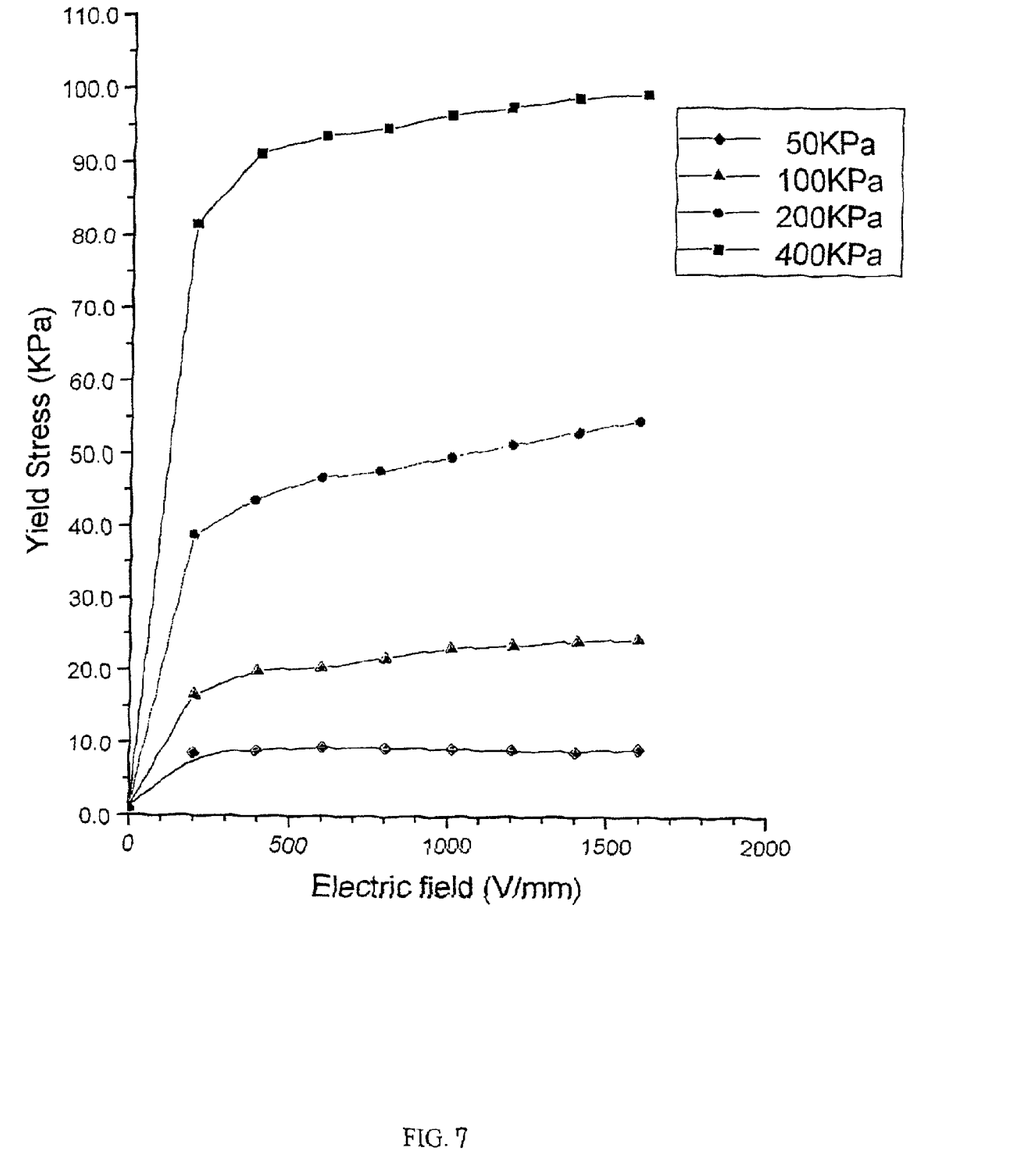
FIG. 7 is a graph showing the results of a yield shear stress measurement in which electric fields, under different constant pressures, having different values and having been applied to the electrorheological fluid according to the apparatus of FIG. 1.
Figure 8:
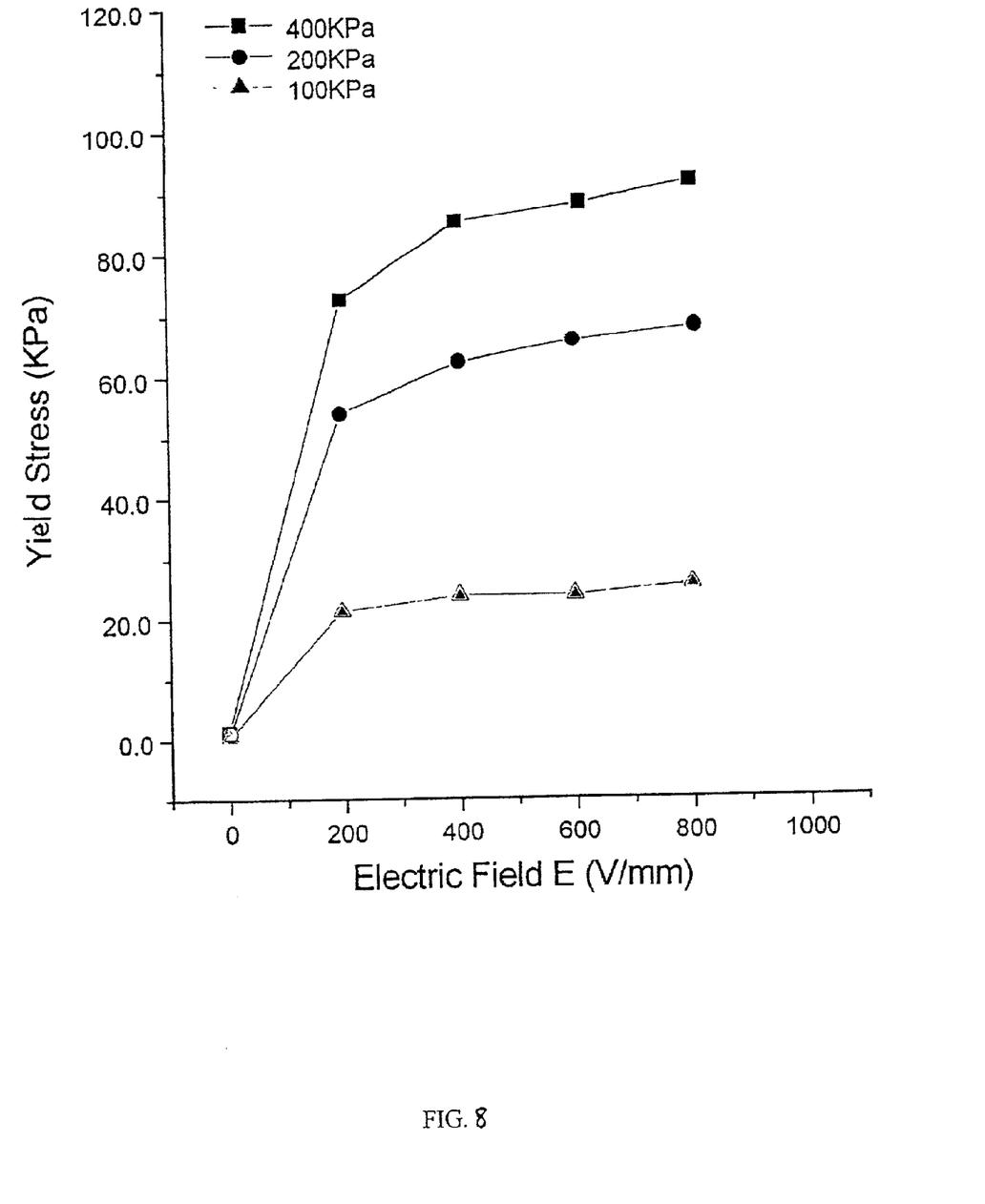
FIG. 8 is a graph showing the results of a yield shear stress measurement in which electric fields, under different constant pressures, having different values and having been applied to the electrorheological fluid according to the apparatus of FIG. 2.

In reference to the first apparatus 20, FIGS. 5–8 are graphs showing the results of a yield shear stress measurement in which electric fields, under different pressures and constant pressure, respectively, having different values and having been applied to the ER fluid 10, according to the present invention. In FIG. 5, when the shear force $SF_1$ that is applied is parallel to the electric field, as in the apparatus of FIG. 1, the yield shear stress of the ER fluid 10 increases almost linearly with the different pressures applied at electric fields of 500 V/mm, 1000 V/mm, and 2000 V/mm. In FIG. 6, when the shear force $SF_2$ that is applied is perpendicular to the electric field, as in the apparatus of FIG. 2, the yield shear stress of the ER fluid 10 increases almost linearly with the different pressures applied at electric fields of 500 V/mm and 1000 V/mm. As the applied electric field increases, the slope k increases slightly but measurably. In FIG. 7, when the shear force $SF_1$ that is applied is parallel to the electric field, the yield shear stress of the ER fluid 10 increases with the applied electric field at constant pressures of 50 kPa, 100 kPa, 200 kPa, and 400 kPa. In FIG. 8, when the shear force $SF_2$ that is applied is perpendicular to the electric field, the yield shear stress of the ER fluid 10 increases with the applied electric field at constant pressures of 100 kPa, 200 kPa, and 400 kPa. As the pressure increases, the yield shear stress also increases more dramatically with the applied electric field. With the technology of the present invention, the ER fluid 10 has a yield shear stress value of about 110 kPa at 2000 V/mm and 400 kPa pressure (FIG. 5), about 95 kPa at 1000 V/mm and 400 kPa pressure (FIG. 6), more than sufficient for many major industrial applications. If the shear force is in an arbitrary direction in the plane perpendicular to the direction of the applied force, it can be decomposed into two components, one parallel to the electric field and the other perpendicular to the electric field. FIGS. 5–8 can then be used to find the yield shear stress in any arbitrary direction perpendicular to the applied pressure. FIGS. 5–8 show that, in both cases, the yield shear stress is greatly raised, and that apparatus 20 and its variations work for a shear force in any arbitrary direction perpendicular to the applied force.

Figure 9:
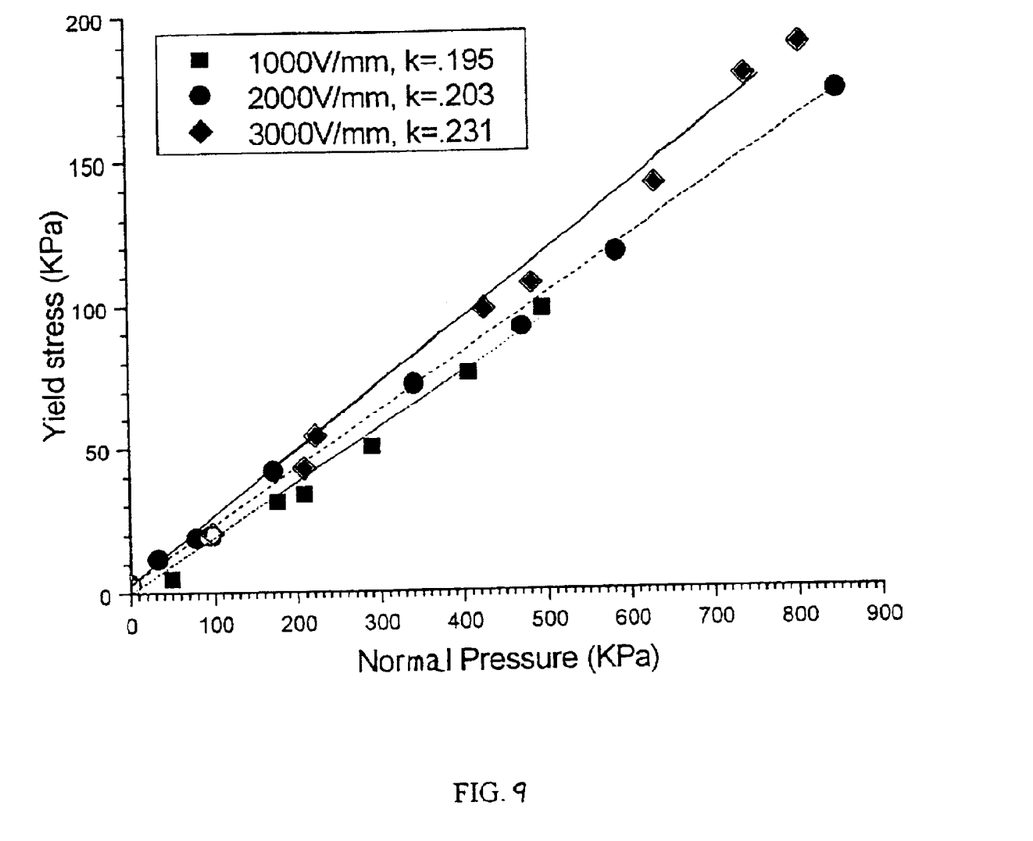
FIG. 9 is a graph showing the results of a yield shear stress measurement in which pressures, under different constant electric fields, having different values and having been applied to the electrorheological fluid according to the apparatus of FIG. 4.
Figure 10:
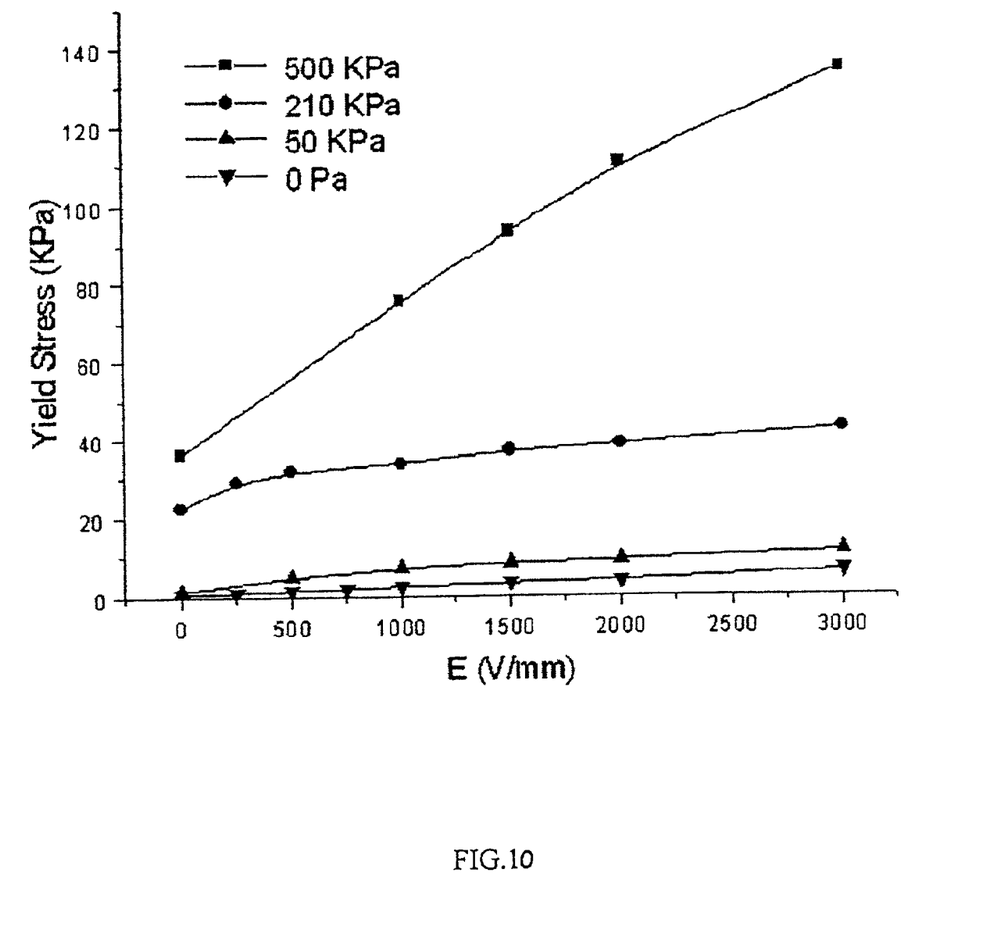
FIG. 10 is a graph showing the results of a yield shear stress measurement in which electric fields, under constant pressures, having different values and having been applied to the electrorheological fluid according to the apparatus of FIG. 4.

In reference to the second apparatus 40, FIGS. 9 and 10 are graphs, similar to the graphs for the first apparatus 20, showing the results of a yield shear stress measurement in which electric fields, under different pressures and constant pressure, respectively, having different values and having been applied to the ER fluid 10, according to the present invention. FIG. 9 shows the yield shear stress of the ER fluid 10 increasing almost linearly with the different pressures applied at electric fields of 1000 V/mm, 2000 V/mm, and 3000 V/mm. As the applied electric field increases, the slope k increases. FIG. 10 shows the yield shear stress of the ER fluid 10 increasing with the applied electric field at constant pressures of 50 kPa, 210 kPa, and 500 kPa. As the pressure increases, the yield shear stress also increases more dramatically with the electric field. With the technology of the present invention, the ER fluid 10 has a yield shear stress value of about 200 kPa at 3000 V/mm and 800 kPa pressure, roughly a 40-fold improvement due to the application of pressure, and more than sufficient for most major industrial applications.

FIGS. 9 and 10, when combined with FIGS. 5–8, can be used to find the increase in yield shear stress with the applied pressure in any arbitrary direction with respect to the applied electric field. This shows that the yield shear stress is greatly raised in all cases and that a combination of apparatus 20 and of apparatus 40 (the third embodiment of the apparatus of the invention) works for a shear force in any arbitrary direction with respect to the applied force and to the applied electric field.

The present invention increases the strength, or yield shear stress, of ER fluids 10 by a factor that, depending on the applied pressure, can be as high as 40 or more. With this new technology, ER fluids will have many major industrial applications. For example, ER fluids can be used for an automobile clutch made of two discs and filled with ER fluid between them (FIG. 3). One disc is connected to the engine and the other is connected to the driving wheels. If there is no electric potential difference or pressure applied between the two discs, the ER fluid has practically zero yield shear stress and the clutch is unengaged. When an electric field is applied, followed by an increase in pressure in accordance with the present invention, the ER fluid may reach a yield shear stress of about 200 kPa in milliseconds. Thus, the clutch is engaged. It is clear that such a new automobile clutch will be much more efficient and agile than existing ones and, since it has no wearing parts, it will be more reliable and have a much longer working life.

There is no prior art technology that can produce a yield shear much above 5 kPa. The method of the present invention provides a means for increasing the yield shear stress of ER fluids to over 100 kPa and up to as much as 200 kPa or more, which exceeds the requirement of most major industrial applications. In addition, the methods of the present invention can be applied to many, or all, of the existing ER fluids since they are general and effective.

It is to be understood that the present invention is not limited to the preferred or other embodiments described herein, but encompasses all embodiments within the scope of the following claims.

What is claimed is:

1. A method for increasing the yield shear stress of an electrorheological fluid, the method comprising the steps of:

a) applying a sufficient electric field to the electrorheological fluid to cause particles within the electrorheological fluid to form into chains of particles within the electric field; and b) applying a sufficient pressure to the electrorheological fluid, after step a) and while substantially maintaining the electric field applied In step a), to cause the chains of particles to thicken or aggregate and Impart to the electrorheological fluid an increase in the yield shear stress;

wherein the electric field applied in step a) is in the range of about 250 V/mm to about 3000 V/mm and the pressure applied in step b) is in the range of about 50 kPa to about 850 kPa.

2. The method according to claim 1, wherein the pressure in step b) is applied in substantially any direction relative to the direction of the electric field, thereby shortening and thickening the chains of particles in the electrorheological fluid, or aggregating and thickening the chains of particles in the electrorheological fluid, or both.

3. The method according to claim 1, wherein the electric field is applied by applying an electric potential difference between at least one first electrode having a first electric potential and at least one second electrode having a second electric potential.

4. The method according to claim 3, wherein said electric potential difference is applied between one first electrode and a plurality of second electrodes.

5. The method according to claim 3, wherein said electric potential difference is applied between a plurality of first electrodes and a plurality of second electrodes.

6. The method according to claim 1, including an additional step for promptly modulating the yield shear stress of the electrorheological fluid comprising:

c) decreasing or increasing the applied pressure, after step b), to modulate the yield shear stress downwardly or upwardly, respectively; or d) decreasing or increasing the applied electric field, after step b) to modulate the yield shear stress downwardly or upwardly, respectively; or e) combining steps c) and d) to modulate the yield shear stress upwardly or downwardly as desired.

7. The method according to claim 6, further comprising a step of removing at least one of the applied electric field and the applied pressure to produce a reduced yield shear stress.

8. The method according to claim 7, wherein the applied electric field is removed to produce a yield shear stress of about 0.

9. The method according to claim 1, wherein the electric field is about 1000 V/mm to about 3000 V/mm.

10. The method according to claim 1, wherein the pressure applied is about 300 kPa to about 800 kPa.

* * * * *